US012722940B2

(12) United States Patent
Stärklow et al.

(10) Patent No.: US 12,722,940 B2
(45) Date of Patent: Sep. 1, 2026

(54) BRAKE SYSTEM FOR USE IN SHAFT AND INCLINED CONVEYOR SYSTEMS

(71) Applicant: SIEMAG TECBERG GmbH, Haiger / Kalteiche (DE)

(72) Inventors: Sergei Stärklow, Haiger / Kalteiche (DE); Sergej August, Haiger / Kalteiche (DE)

(73) Assignee: SIEMAG TECBERG GmbH, Haiger / Kalteiche (DE)

( * ) Notice: Subject to any disclaimer, the term of this patent is extended or adjusted under 35 U.S.C. 154(b) by 503 days.

(21) Appl. No.: 18/143,286

(22) Filed: May 4, 2023

(65) Prior Publication Data

US 2023/0365380 A1 Nov. 16, 2023

(30) Foreign Application Priority Data

May 10, 2022 (LU) ........................................ 102951

(51) Int. Cl.

*B66B 5/18* (2006.01)
*F16D 59/00* (2006.01)
*F16D 121/06* (2012.01)

(52) U.S. Cl.

CPC ................ *B66B 5/18* (2013.01); *F16D 59/00* (2013.01); *F16D 2121/06* (2013.01)

(58) Field of Classification Search

None

See application file for complete search history.

(56) References Cited

U.S. PATENT DOCUMENTS

| | | | | |
|---|---|---|---|---|
| 6,540,309 B1 * | 4/2003 | Jordan | .................... | B60T 8/321 303/122.07 |
| 7,413,265 B2 * | 8/2008 | Tione | ...................... | B60T 8/885 303/122.04 |
| 2015/0123458 A1 | 5/2015 | Schubert | | |

FOREIGN PATENT DOCUMENTS

| | | | |
|---|---|---|---|
| CN | 108298452 | A | 7/2018 |
| CN | 214734070 | U | 11/2021 |
| DE | 102019133011 | A1 | 6/2021 |
| WO | 2020/016289 | A1 | 1/2021 |

* cited by examiner

*Primary Examiner* — Melanie Torres Williams
(74) *Attorney, Agent, or Firm* — 24IP Law Group USA, PLLC; Timothy R DeWitt

(57) ABSTRACT

A brake system for use in shaft and inclined conveyor systems in mining, with several brake channels for releasing or applying brake force generators to provided braking surfaces (2), wherein a first main pressure control path and a second secondary pressure control path, which is activated in the event of a fault in the main pressure control path, are provided for each brake channel and wherein a plurality of, preferably safe, central processing units (CPUs) with associated signal and voltage supply are provided for redundant control of the main and secondary pressure control paths of the several brake channels, wherein each, preferably safe, CPU is provided for controlling the main pressure control path of at least one brake channel associated therewith, as well as a secondary pressure control path of at least one other of the plurality of brake channels.

5 Claims, 1 Drawing Sheet

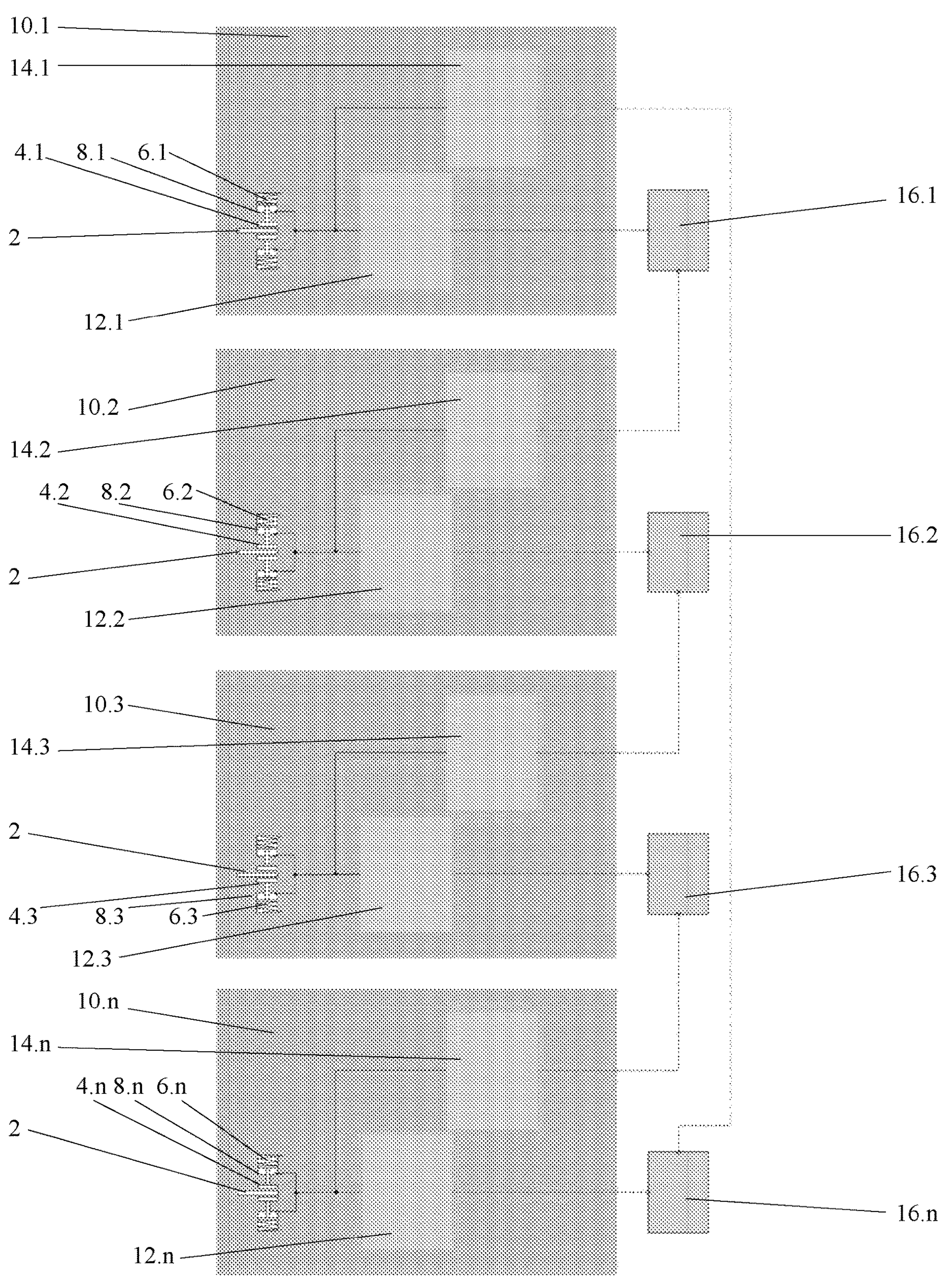
10.1
14.1
4.1
8.1
6.1
2
12.1
16.1
10.2
14.2
4.2
8.2
6.2
2
12.2
16.2
10.3
14.3
2
4.3
8.3
6.3
12.3
16.3
10.n
14.n
4.n
8.n
6.n
2
12.n
16.n

BRAKE SYSTEM FOR USE IN SHAFT AND INCLINED CONVEYOR SYSTEMS

CROSS-REFERENCE TO RELATED APPLICATIONS

The present application claims priority to Luxembourg Patent Application Serial No. LU102951 filed on May 10, 2022.

The aforementioned patent application is hereby incorporated by reference in its entirety.

BACKGROUND OF THE INVENTION

Field of the Invention

The present invention relates to a braking system for use in conveyor machines for shaft and inclined conveyors, as described by the generic term of the independent claims.

Brief Description of the Related Art

In modern shaft hoisting systems, which in some cases reach depths of over a thousand meters, the correct and reliable functioning of the hoisting machine's brakes in every situation plays a decisive and central role.

With the ever-increasing complexity of electronic components in braking systems, the possibility of malfunctions also increases. If a safety-relevant component is affected by such a malfunction, people can be injured in the worst case. If, for example, a component of an electro-hydraulic or electro-pneumatic braking system were to unexpectedly trigger an emergency braking maneuver during the hoisting operation of the shaft hoisting system, this could lead to injuries or even death of people, animals or damage to the environment, as well as to considerable damage to material or equipment.

To minimize the risk of hazardous malfunctions of safety-related electrical, electronic or programmable electronic (E/E/PE) systems, they should be developed in accordance with relevant standards.

Functional safety refers to the part of the safety of a system, such as the braking system of a shaft or inclined conveyor, that depends on the correct functioning of the safety-related system and other risk-reducing measures. The focus is therefore on the function, hence the term "functional safety". It must be demonstrated that the E/E/PE systems, in this case the brake control, safely and reliably provide the required functionality despite increasing complexity.

Due to the increasingly important global requirements for functional safety in machines and systems, in particular also in shaft and inclined conveyor systems, it is necessary to have technical solutions available that fulfil gaps in the standard assessments carried out by the manufacturers of the individual components for the existing functional safety and allow a reliable assessment of the failure probabilities and thus avoid dangerous braking processes.

Known types of valves in braking systems are mechanically fixed pressure relief valves or proportional valves for pressure control.

These valves have different disadvantages. For example, mechanical pressure relief valves cannot be adjusted as needed during operation. The determination of a failure probability by manufacturers of proportional valves is limited to the evaluation of the extreme positions, either completely open or closed. Thus, a reliable determination of failure probabilities for active pressure control by the manufacturers is not available.

The evaluations of commercially available components, in particular of proportionally adjustable valves, i.e. continuously adjustable valves that limit the output pressure as a function of electric current, are usually based only on the respective end values, i.e. the minimum value or maximum value, which represent the state after switching off the power supply, but not the intermediate control range, which, however, is of great importance for a controlled braking of a conveyor system in the event of, for example, a power failure.

Another disadvantage of previously known systems with fixed pressure valves is the necessity to use several valves with different preset pressure values for each pressure level to be set, which are always preselected to the required value by a control system.

Known are pressure relief assemblies for use in braking systems, which are used in shaft and inclined conveyor systems, sinking systems or emergency or auxiliary travel systems, which can quickly reduce the system pressure in the braking system to a preset pressure level, i.e., the braking pressure, in the event of a fault or, if required, also in the event of a power failure. These systems can quickly reduce the system pressure in the braking system to a preset pressure level, i.e., the braking pressure, in the event of a fault or on demand, i.e., in the event of a power failure, and then maintain this pressure at the level reached for a preset period of time, i.e., the braking time, in order to prevent, for example, a catastrophic emergency braking or a crash of the conveyor.

Such braking systems with constant braking force already have functional safety. However, they cannot be used flexibly on all conveyors, regardless of load and type of conveyor, often require more effort and are therefore more cost-intensive or technically difficult to implement.

SUMMARY OF THE INVENTION

There is a need for the creation of an active control of the braking deceleration of hoisting machines in the case of safety braking, which can be evaluated in terms of functional safety, for the realization of a braking system for use in hoisting machines in mining with constant deceleration, which can be realized independently of the type of hoisting machine and load. This task is solved by the present invention.

A braking system for use in shaft and inclined conveyor systems in mining is provided, with several brake channels for releasing or applying braking force generators to the braking surfaces provided or for adjusting the respective braking force to provide the required braking deceleration, wherein for each brake channel a first main pressure control path and a second secondary pressure control path, which activates itself in the event of a fault in the main pressure control path, as a backup for the same brake channel are provided, in each case with the corresponding valve arrangements, and wherein a plurality of safe central processing units (CPUs) with associated signal and voltage supply are provided for controlling the valve arrangements of the main and secondary pressure control paths of the multiple brake channels.

The braking system according to the present invention is preferably designed with four channels. However, it can also be designed with three channels or with more than four brake channels without leaving the scope of the invention.

For the purposes of this patent application, the term "conveyor system" includes, in addition to conveying machines, spools and winches.

By providing several pressure control paths per brake control channel, the probability of failure of the respective channels is minimized, as in each case a pressure control path is available as a backup or standby, through the redundant control of a brake channel with two CPUs.

Preferably, the braking system is designed in such a way that each, preferably safe, CPU is provided for controlling the main pressure control path of at least one brake channel assigned to it as well as a secondary pressure control path of at least one other of the several brake channels, i.e., essentially crosswise.

In the event of an error in the main pressure control path of a brake channel, the CPU assigned to this channel switches off not only this main pressure control path, but also the respective secondary pressure control path of the other brake control channel, which is also assigned to it. The secondary pressure control path of one brake control channel assigned to the CPU and the main pressure control path of the other brake control channel assigned to the CPU continue to be supplied by other, preferably safe, CPUs. In this way, all brake channels remain fully available even in the event of a fault on a main or secondary pressure control channel.

The measures mentioned above result in a multi-channel, fault-tolerant braking system with controlled deceleration and fulfilment of the functional safety requirements.

The braking system can be hydraulic or pneumatic and can take place in a braking system for friction conveyor machines, but also in a braking system for drum conveyor machines.

Finally, there is also provided a method of controlling a braking system for use in shaft or inclined mining conveyors having a plurality of brake channels for releasing or applying braking force generators to provided braking surfaces or for adjusting the respective braking force to provide the required braking deceleration, characterized by the steps of providing a first main pressure control path and a second secondary pressure control path per brake channel, the provision of a plurality of preferably safe central processing units (CPUs) with associated signal and voltage supply, the control of the valve arrangements of the main pressure control path of at least one brake channel as well as a secondary pressure control path of at least one other of the plurality of brake channels, by a respective, preferably safe, CPU, the switching off of the first, active main pressure control path of a brake control channel and the second, passive secondary pressure control path of another brake control channel, by the, preferably safe, CPU assigned to these pressure control paths in the event of a fault, and the continued operation of one and the other brake channel by the second secondary pressure control path of one brake channel and the first main pressure control path of the other brake channel by a different, preferably safe, CPU.

Thus, an active control of the braking deceleration of hoisting machines in the case of safety braking, which can be evaluated in terms of functional safety, is created for the realization of a braking system for use in hoisting machines in mining with constant deceleration, which can be realized independently of the type of hoisting machine and load.

In the braking system according to the present invention, the brake elements of a brake channel only fail, i.e., the brake pads rest uncontrollably on brake surfaces or remain open, although they should be applied, when two, preferably safe, CPUs fail. This represents a considerable increase in system safety.

Further features and characteristics of the invention result from the following non-limiting description of a partial control scheme of a brake control according to the invention.

BRIEF DESCRIPTION OF THE DRAWINGS

For a more complete understanding of the present invention and the advantages thereof, reference is now made to the following description and the accompanying drawings, in which:

FIG. 1 schematically shows the functional diagram of a multi-channel hydraulic brake for use in shaft and inclined conveyor systems in mining with brake surfaces 2 and brake linings 4.1, 4.2, 4.3 and 4.*n*, which in the normal state are pressed against the brake disc 2 by springs 6.1, 6.2, 6.3 and 6.*n* as shown. To release the brake, the cylinders 8.1, 8.2, 8.3 and 8.*n* are hydraulically pressurized via the brake ducts 10.1, 10.2, 10.3 and 10.*n* so that the brake pads 4.1, 4.2, 4.3 and 4.*n* are released and the brake is thus released.

What can also be taken from FIG. 1, each brake channel 10.1, 10.2, 10.3 and 10.*n* has a first main pressure control path 12.1, 12.2, 12.3 and 12.*n* for control operation and a second secondary pressure control path 14.1, 14.2, 14.3 and 14.*n* as Hot-Standby, each with the corresponding valve arrangements (not shown), which activates independently in the event of a fault in the main pressure control path. The valves provided for each brake channel (not shown) include proportional valves.

Each of the brake channels 10.1, 10.2, 10.3 and 10.*n* is, as can also be seen in FIG. 1, provided with a, preferably safe, Central Processing Unit (CPU) 16.1, 16.2, 16.3 and 16.*n* with associated signal and voltage supply for controlling the valve arrangements, or the proportional valves, (not shown) of the main pressure control path. The, preferably safe, central processing units (CPUs) 16.1, 16.2, 16.3 and 16.*n* control, in addition to the respective valve arrangements or proportional valves (not shown) of the main pressure control path 12.1, 12.2, 12.3 and 12.*n* of a first brake channel 10.1, 10.2, 10.3 and 10.*n*, also the valve arrangements or proportional valves (not shown) of the secondary pressure control path 14.1, 14.2, 14.3 and 14.*n* of another of the brake channels 10.1, 10.2, 10.3 and 10.*n*.

In the event of a fault, the respective, preferably safe, Central Processing Unit (CPU) 16.1, 16.2, 16.3 and 16.*n* switches, in addition to the main pressure control path 12.1, 12.2, 12.3 and 12.*n* of the first brake channel 10. 1, 10.2, 10.3 and 10.*n* also the secondary pressure control path 14.1, 14.2, 14.3 and 14.*n* assigned to the same, preferably safe, central processing unit (CPU) of the second, other brake channel 10.1, 10.2, 10. 3 and 10.*n*, off, where the first and second brake channels 10.1, 10.2, 10.3 and 10.*n* are controlled by the secondary pressure control paths 14.1, 14.2, 14.3 and 14.*n* of the first brake channel and the main pressure control paths 12.1, 12.2, 12.3 and 12.*n* of the second, other brake channels 10.1, 10.2, 10.3 and 10.*n*, so that a fault-tolerant controlled deceleration is possible while fulfilling the requirements for functional safety.

During operation, the system is supplied with pressure by a pump system (not shown) and relieved towards a tank (not shown). A non-return valve unit (not shown) prevents the pressure from being reduced in the direction of the pump system. If the pressure supply fails, the system brakes automatically.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the aforementioned documents is incorporated by reference herein.

What is claimed is:

1. A brake system for use in shaft and inclined conveyor systems in mining, with several brake channels for releasing or applying brake force generators to provided braking surfaces, wherein a first main pressure control path and a second secondary pressure control path, which is activated in the event of a fault in the main pressure control path, are provided for each brake channel and wherein a plurality of central processing units (CPUs) with associated signal and voltage supply are provided for redundant control of the main and secondary pressure control paths of the several brake channels, wherein each CPU is provided for controlling the main pressure control path of at least one brake channel associated therewith, as well as a secondary pressure control path of at least one other of the plurality of brake channels, wherein said secondary pressure control path of the at least one other of the plurality of brake channels is separate from the main pressure control path of at least one brake channel associated therewith.

2. A brake system according to claim 1, wherein one CPU is provided for each brake channel, which CPU controls the main pressure control path of the brake channel assigned to it as well as the secondary pressure control path of another of the several brake channels.

3. A method for controlling a brake system for use in shaft and inclined conveyor systems in mining, having a plurality of brake channels for releasing or applying brake linings to brake surfaces provided, comprising the steps:

providing a first main pressure control path and a second secondary pressure control path per brake channel;

providing a plurality of central processing units (CPUs) with associated signal and voltage supply;

control of the valve arrangements of the main pressure control path of at least one brake channel and of a secondary pressure control path of at least one other of the plurality of brake channels by a respective CPU;

in the event of a fault, switching off the main pressure control path of a first brake control channel and the secondary pressure control path of a second brake control channel by the CPU assigned to these pressure control paths; and continuing operation of the one and the other brake channel through the second secondary pressure control path of the one brake channel and the first main pressure control path of the other brake channel through the CPU assigned to these pressure control paths.

4. A brake system according to claim 1, wherein said CPU is a fail-safe CPU.

5. The method for controlling a brake system according to claim 3, wherein said CPU is a fail-safe CPU.

* * * * *